United States Patent
Barillaud

(10) Patent No.: US 7,143,129 B2
(45) Date of Patent: Nov. 28, 2006

(54) SYSTEM AND METHOD FOR DISTRIBUTING PROXIMITY INFORMATION USING A TWO-TIERED BOOTSTRAP PROCESS

(75) Inventor: Franck Barillaud, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 09/918,594

(22) Filed: Jul. 31, 2001

(65) Prior Publication Data

US 2003/0028627 A1 Feb. 6, 2003

(51) Int. Cl.
*G06F 15/16* (2006.01)

(52) U.S. Cl. .................................. 709/202; 709/222
(58) Field of Classification Search .......... 709/202, 709/222, 217, 224; 717/168
See application file for complete search history.

(56) References Cited

U.S. PATENT DOCUMENTS

| | | | |
|---|---|---|---|
| 5,740,369 A | 4/1998 | Yokozawa et al. | 395/200.47 |
| 5,742,521 A | 4/1998 | Ellenby et al. | 364/550 |
| 5,787,414 A | 7/1998 | Miike et al. | 707/2 |
| 5,796,351 A | 8/1998 | Yabuki | 340/625.69 |
| 6,031,545 A | 2/2000 | Ellenby et al. | 345/435 |
| 6,148,327 A * | 11/2000 | Whitebread et al. | 709/202 |
| 6,169,498 B1 * | 1/2001 | King et al. | 340/686.1 |
| 6,181,935 B1 | 1/2001 | Gossman et al. | 455/433 |
| 6,233,601 B1 * | 5/2001 | Walsh | 709/202 |
| 6,507,727 B1 * | 1/2003 | Henrick | 455/3.06 |
| 6,622,157 B1 * | 9/2003 | Heddaya et al. | 709/202 |
| 6,785,659 B1 * | 8/2004 | Landsman et al. | 705/14 |
| 6,785,834 B1 * | 8/2004 | Chefalas et al. | 714/4 |
| 6,809,631 B1 * | 10/2004 | Doi et al. | 340/5.86 |

FOREIGN PATENT DOCUMENTS

WO    WO 96/27985    9/1996

OTHER PUBLICATIONS

Packers.com Handheld/Wireless; www.packers.com/av_room/handheld/index.html.
Alaska Air Invites Wireless Check–In; www.pcworld.com/news/article /0,aid,39262,00.asp.

* cited by examiner

*Primary Examiner*—Abdullahi E. Salad
(74) *Attorney, Agent, or Firm*—VanLeeuwen & VanLeeuwen; Joseph T. Van Leeuwen; Jeffrey S. LaBaw

(57) ABSTRACT

A system and method for using an adaptable agent for downloading information to a handheld device in conjunction with the admittance to an event is presented. When a person attends an event, a generic bootstrap agent is downloaded into the persons' handheld device. The bootstrap agent downloads a lifecycle control agent that is the primary agent that requests and receives information corresponding to the event. Both agents monitor each other and restart each other if an agent is determined to not be operating properly. The agent is temporary and is removed when the event concludes. Information, or content, that is downloaded to the user's handheld device may be stored for later retrieval after the event, or the information may be removed following a certain time limit as determined by the information vendor.

21 Claims, 11 Drawing Sheets

SYSTEM AND METHOD FOR DISTRIBUTING PROXIMITY INFORMATION USING A TWO-TIERED BOOTSTRAP PROCESS

RELATED APPLICATIONS

This application is related to the following co-pending U.S. Patent Application filed on the same day as the present application and having the same inventor and assignee: "System and Method for Managing Information Exchange Using Strip Information Elements," (application Ser. No. 09/918,563) by Barillaud and assigned to the IBM Corporation.

BACKGROUND OF THE INVENTION

1. Technical Field

The present invention relates in general to a system and method for exchanging data between computing devices. More particularly, the present invention relates to a system and method for using an adaptable agent for downloading information to a handheld device in conjunction with the admittance of a user to an event.

2. Description of the Related Art

In the pervasive device environment, handheld devices communicate with external entities. When the information exchange requires more than a single and simple communication exchange, one of the best approaches to solve the problem is to have an agent within the handheld computing device that takes care of the communication exchange. An agent is a program that performs information gathering or processing task in the background. Typically, an agent is given a very small and well-defined task. Tasks involved in the communication exchange include requesting and receiving the proper information content type. Examples of information content are text, non-real time video, real time video, and music. Bandwidth resources are wasted when a service provider sends text and video information to a device that is capable of processing text, but not video. Another varying factor in handheld devices is the screen. Many pagers have a small, monochrome screen, while laptop computers, however, often have larger, color screens. Bandwidth resources are wasted when a service provider sends information to the paging device that the paging device is not able to display properly. Unfortunately, there is no unique, common agent able to handle the different types of communication for the different types of information content.

The type and amount of electronic devices for information exchange are increasing and improving at an exceptional rate due to the investments in technology research. Mobile telephones today, for example, are able to communicate on multiple frequencies as well as multiple air interfaces (analog, CDMA, TDMA, etc.). Mobile phones are also useful for more than just for phone conversations. For example, many mobile telephones can access the Internet or a host of services that provide information. Other handheld communication devices also have greatly improved capabilities in comparison to devices offered only a few years ago. Pagers can now transmit messages as well as access Internet information. Many Personal Digital Assistants (PDA's) have wireless connections that allow the PDA to send and receive wireless data and access computer networks, such as the Internet. With the increasing quantity and quality of portable electronic devices, a challenge is to develop an agent that is able to support the many devices that are available, as well as devices that are soon to be available.

What is needed, therefore, is an agent that is adaptable to the constraints and features provided in any number of possible handheld devices.

SUMMARY

It has been discovered that by introducing a two-step agent loading process, an agent can adapt to a targeted handheld device. A bootstrap agent is first loaded in the handheld device. The bootstrap agent manages the downloading of a second, more specialized agent that is based on both the characteristics of the handheld device and the services to which the user has subscribed. Both agents have functionality to monitor the operation of the other agent. In this manner, if one agent fails, the other agent restarts the failed agent.

The agents control the information that is shown to the user. Event ID's are attached to information being transmitted by the service provider. An event ID identifies an event that corresponds to downloadable information. The agent compares the event IDs with the ID of the event to which the user has subscribed. The agent displays information that matches the ID of the event to which the user is subscribed. Information types are managed by the agents. In this manner, the agent does not request video information if the handheld device is not capable of displaying it or if the subscriber has not subscribed to a video service. The agents can also be time limited and removed after an event takes place. The time limit is extendable if the service provider chooses.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
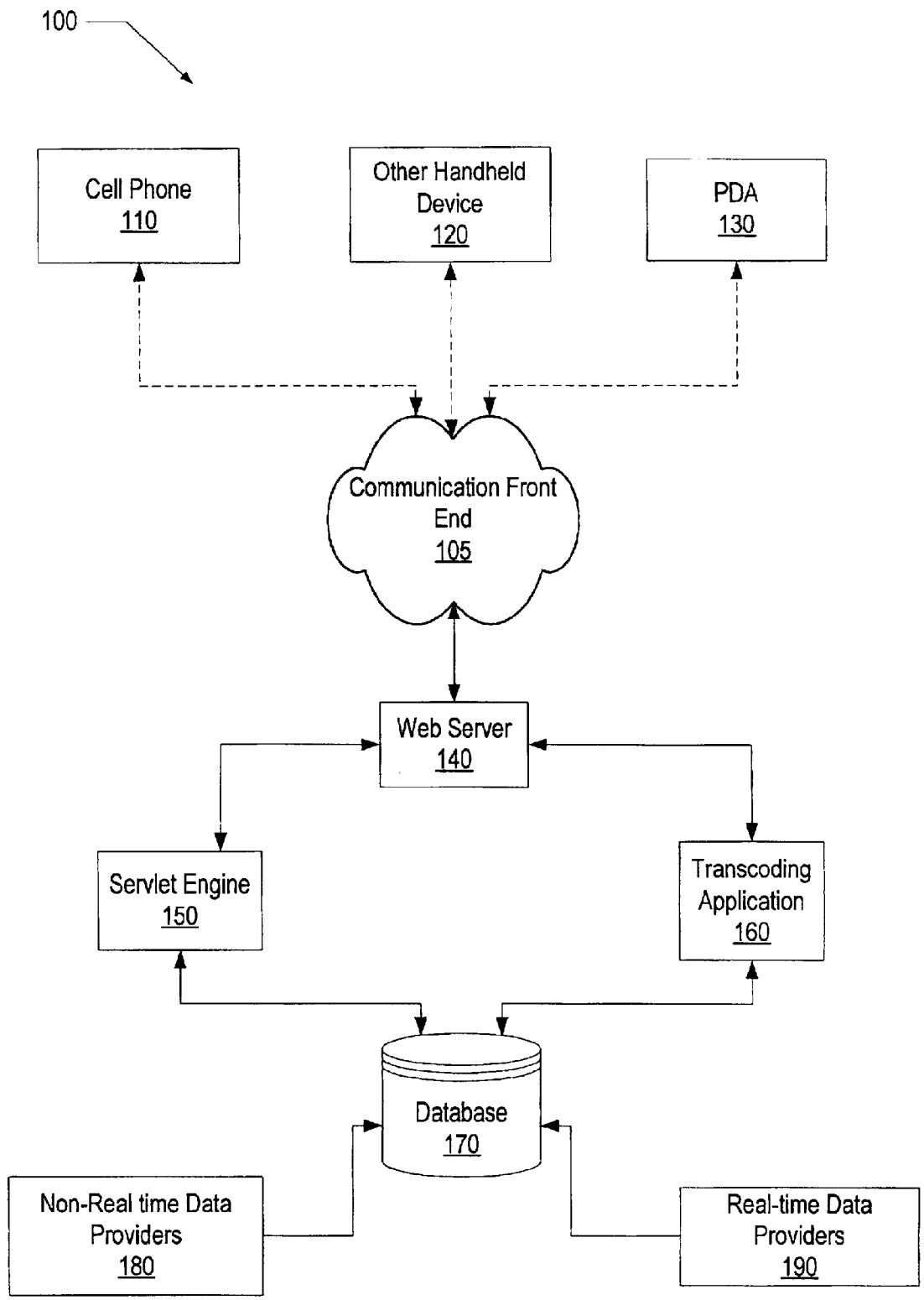
FIG. 1 is high level diagram of a Interactive Proximity Service Architecture.

FIG. 1 is high level diagram of an Interactive Proximity Service Architecture (IPSA). The core function of Interactive Proximity Service Architecture 100 is to transmit data from a single or multiple websites to a variety of wireless devices sharing the same proximity environment. The transmission of data is based not only on service provider actions, but also on user requests. Examples of data transmitted via the service include video replay and latest statistics of a player that just hit a home run during a baseball game, or audio excerpts of a painter's biography as the visitor is looking at his painting in a museum. Interactive Proximity Service Architecture 100 can be configured to communicate with handheld devices for a single event or for multiple events. For example, a baseball game may have one IPSA, and a football game in the same proximity may have a separate IPSA. As those skilled in the art can appreciate, a single IPSA can also be configured to support and communicate with multiple events (i.e. one IPSA supporting both a baseball game and a football game).

A subscriber carries cell phone 110, personal digital assistant (PDA) 130, or other handheld device 120 to an event. Examples of other handheld devices includes electronic items such as a laptop computers. The subscriber enters an event and the handheld devices communicate with communication front end 105. Communication front end 105 can be an infrared port, a wireless system such as a cellular or paging network. Communication front end 105 analyzes the signals from the handheld devices, and passes the information requests to web server 140. For example, information requests can be in Hyper Text Transfer Protocol (HTTP) format. Web Server 140 communicates with Servlet Engine 150 and Transcoding Application 160. Transcoding Application 160 ascertains the type of device accessing the site and applies the proper style to display the data. For example, the screen size and resolution of the device are used in determining the proper style to display the information. Web server HTTP requests trigger Java servlets in servlet engine 150. Servlet engine 150 accesses database 170 for the requested information, such as downloadable video or text content. Database 170 includes basic information and may be updated with new static information from non-real time data provider 180 or real-time information from real-time data provider 190. Database 170 information includes formats such as text, audio, and video.

Figure 2:
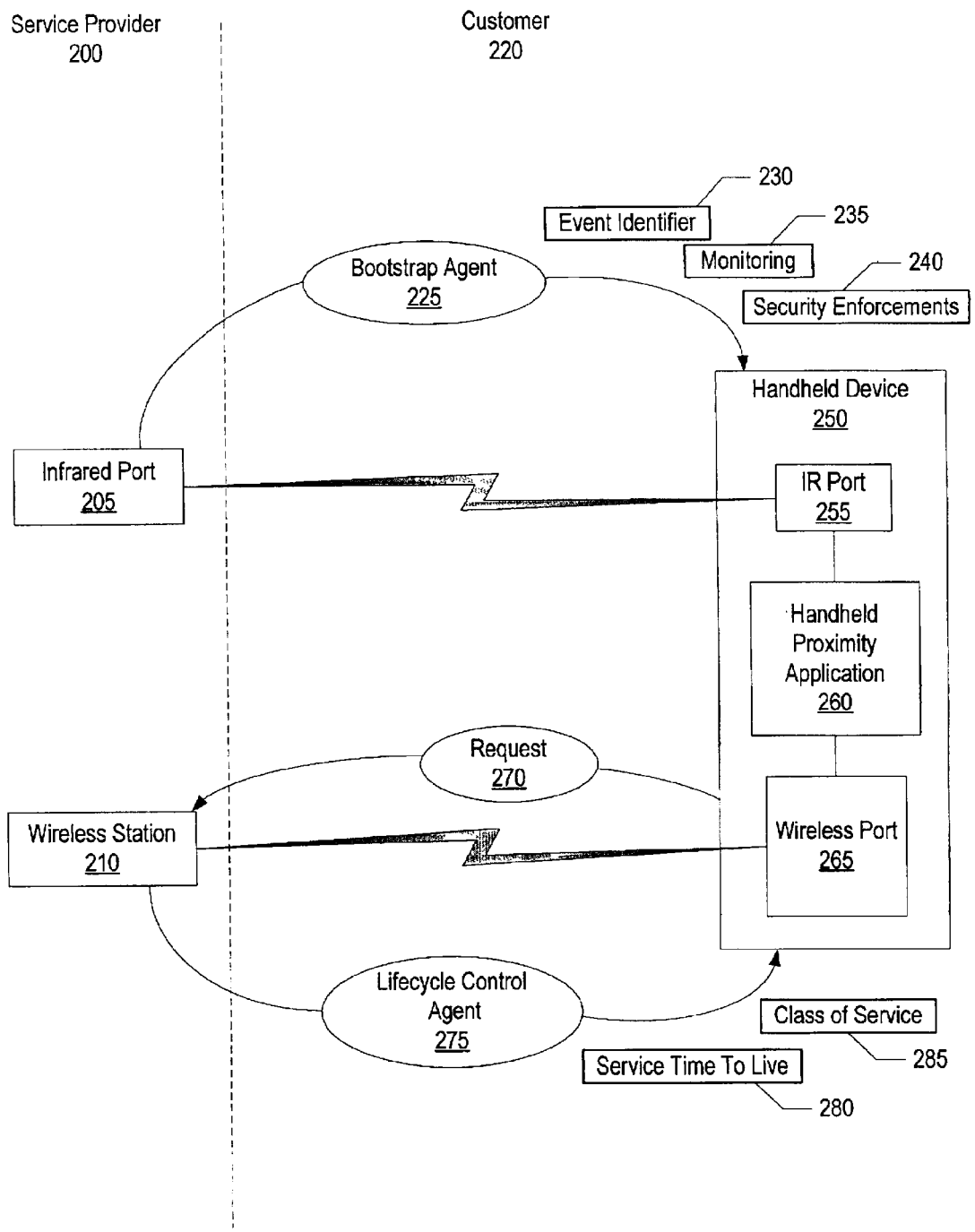
FIG. 2 is a diagram of a bootstrap agent and lifecycle control agent being downloaded into a handheld device.

FIG. 2 is a diagram of a bootstrap agent and lifecycle control agent being downloaded into a handheld device. An Agent at the Gate concept means that every time a customer attends an event (sports game, museum, conference, etc.) a unique agent for the event downloads to his handheld device. The process is performed in two steps whereby a Bootstrap Agent (BA) is downloaded to the customer handheld device through the infrared port and the bootstrap agent in turn downloads the Lifecycle Controlled Agent (LCA) through a faster wireless link. Both BA and LCA have functionality that allows a mutual monitoring so if one agent fails, the other reloads and restarts the one which failed.

When customer 220 arrives at an event that includes Interactive Proximity services from Service Provider 200, customer 220 downloads bootstrap agent 225 from the service providers' (200) infrared port 205. Bootstrap agent 225 is downloaded into customers' handheld device 250 through customer's Infrared port 255. The primary purpose of the Bootstrap agent is to download the Lifecycle Controlled Agent (LCA). The bootstrap agent includes transfer and security functionality such as event identifier 230, monitoring functionality 235, and security enforcements 240. Event Identifier 230 is unique and is used as a discriminator so that there is no overlap between information exchanged in different events that happen in the same proximity range at the same time. Monitoring 235 and security enforcement 240 are used to monitor the proper operation of the Lifecycle Controlled Agent and to reload the LCA if the LCA stops functioning. Once the bootstrap agent is loaded into handheld proximity application 260, the bootstrap agent sends request 270 through handheld device wireless port 265 to download the lifecycle control agent. When service providers wireless station 210 receives request 270, wireless station transmits lifecycle control agent 275 that includes service time to live (STTL) 280 and class of service 285. Service time to live 280 is part of the security information with a main purpose of invalidating access to the services and to removing the agent after a certain period of time. This parameter may be upgraded on the fly during the event to meet specific service requirements. For example, the STTL could be extended for a football game that requires an overtime period to conclude. Or a museum can extend the STTL over several days according to the subscription taken by the customer. Class of service (COS) 285 represents different levels of services to which a customer can subscribe. The COS is defined by the event producer and may be different over the time even for the same type of event. Examples of COS are Audio, Text only, Video, and Video+. For Text only COS, the subscriber is allowed to receive and to request information in text format. For Audio, the subscriber receives all audio that is broadcast during the event. For Video COS, the subscriber receives all video that is broadcast during the event. For Video+ COS, the subscriber can interactively query additional video functionality such as slow motion replay or specific camera angles.

Figure 3:
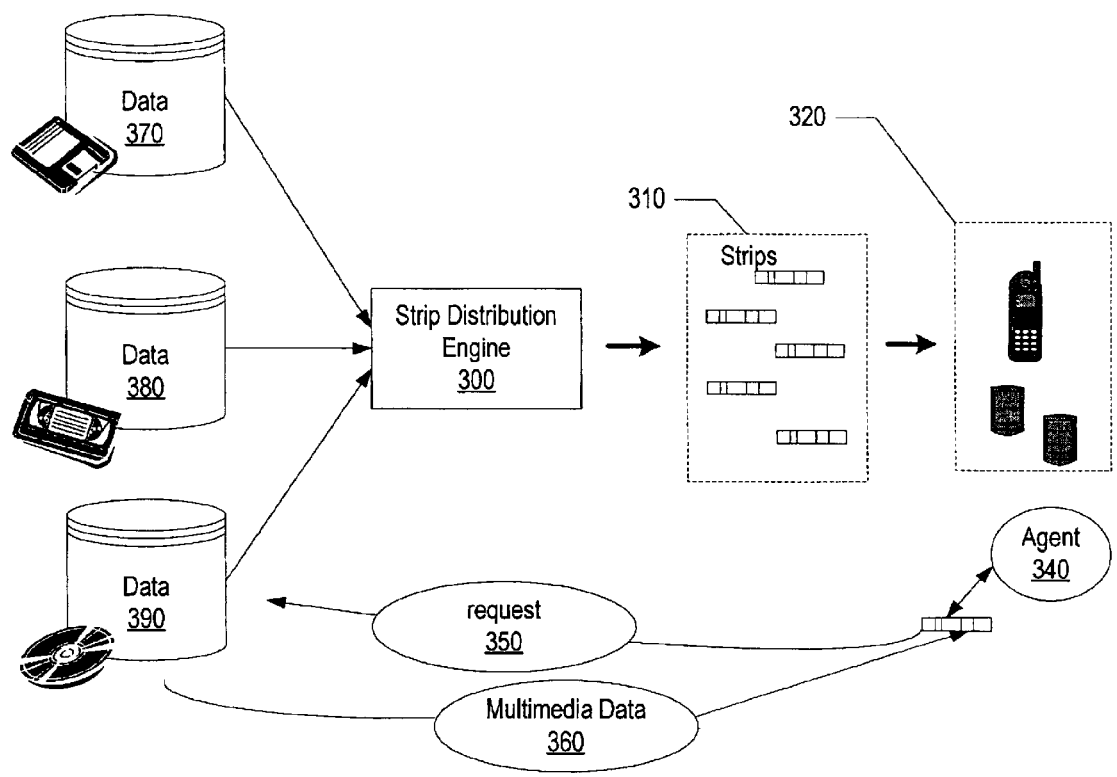
FIG. 3 is a diagram of Strip Information Elements being transmitted from a Strip Distribution Engine.

FIG. 3 is a diagram of Strip Information Elements being transmitted from a Strip Distribution Engine. Strip Distribution Engine 300 sends strips 310 to handheld devices 320 for a particular event. Strips 310 do not include all the data but includes elements necessary to retrieve, format, and display the information. The Information Proximity Service Architecture sends SIEs instead of pushing the whole information from the servers to the handheld devices in order minimize bandwidth usage. Agent 340 is internal to the handheld device and analyzes the strips that are sent to a handheld. Agent 340 authenticates the strip by analyzing the strips' Event Identifier to prevent distribution of unauthorized information. After the security checking is completed, the strip is under the control of the local agent that scans the different fields and makes determinations according to the content of the fields. When the user wants to download data, the user sends request 350 to retrieve a particular piece of data. For example, request 350 can be for multimedia data such as video. Strip Distribution Engine sends multimedia data 360 to the handheld device. Multimedia information can be obtained from database 390 which can include video plus hypertext links. Data can also be obtained from database 380 which may contain video, or database 370 which may only contain text information.

Figure 4:
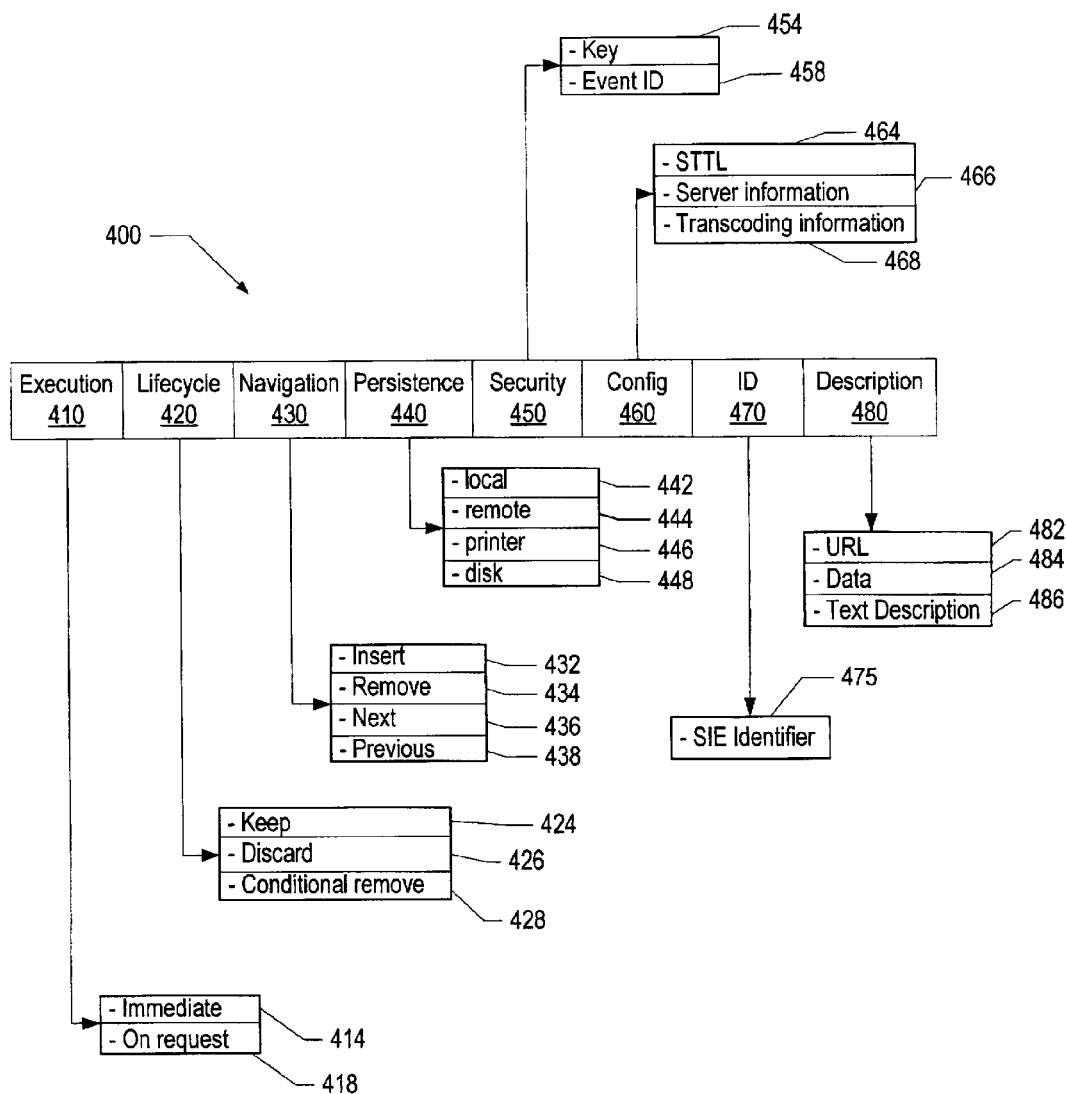
FIG. 4 shows the field information included in a Strip Information Element.

FIG. 4 shows the field information in a Strip Information Element. Strip information Element (SIE) 400 contains multiple fields that allow the local agent and service provider to communicate to each other. The first field is Execution Field 410. Execution Field 410 includes information that informs the handheld device whether data may be retrieved immediately or on user request. When immediate 414 is selected, the local agent initiates the connection of the wireless station to download the information upon receipt of the SIE. When on request 418 is selected, the local agent waits until the user asks for the specific information before downloading it. For example, live video information may be downloaded immediately, while replay video may be on user request.

Lifecycle Field 420 includes information that determines whether the information may be kept after been processed by the local agent. When "keep" option 424 is selected, the user is allowed to keep the data that has been transferred to his handheld device. This field can be set up on a per strip element basis, allowing strict control over what the user is able to keep. For example, due to intellectual property rights limitations, this field could be set up to a value that prevents duplication of the retrieved information that contains intellectual property, but allow the user to keep information that does not contain intellectual property. Another example is that some data are transient at server level, and make it not possible to access the data after a certain period of time. In this case, the lifecycle field will also set up to a value that prevents the local agent to try to access the data. When "discard" option 426 is selected, the downloaded data is discarded from the user's device upon completion of the event. When conditional remove 428 is selected, data may also be accessed multiple times during a certain condition. For example, data may be accessed multiple times during a sporting event, but the data is discarded once the event is over.

Navigation Field 430 includes information for the handheld device to logically store the strip information elements. As the SIE's are downloaded to the handheld device, they are stored in a way that allows an easy access according to a dynamic navigation scheme. Since the display sequence at time t may differ from the display sequence at time t+1, each SIE carries information about the navigation. This information represents the location of the information in a display tree. When a new SIE is received, it is placed in a specific location in the tree and as the dynamic structure of the tree evolves in time, the position of the SIE moves across the tree. When insert 432 is selected, the SIE is inserted between the specified SIE's. When remove 434 is selected, the SIE is removed from the display tree. When next 436 is selected, the SIE is stored in the next available location. When previous 438 is selected, the SIE is stored in the location prior to the last SIE in the display tree.

Persistence Field 440 includes information that specifies what kind of repeated requests are expected for the piece of information. The user can select a persistence option that determines where and how the information is stored. The persistence can be local on the handheld device or remote. If local 442 is selected, the persistence is stored on the handheld device. If remote 444 is selected, persistence is stored on a remote device. Two example fields shown for a remote device are printer 446 and disk 448. If printer 446 is selected, persistence comes from an external printer. If disk 448 is selected, persistence is stored on a nonvolatile storage device, such as a magnetic disk device.

Security Field 450 includes information that pertains to the security of the information being transferred. Security Field 450 includes event ID 458 which is the unique identifier that is used as a first protection level. The event id allows the user to receive information for the particular event subscribed to, and not to receive information from a nearby event that has a different event id. Security Field 450 also includes key 454 which is a key from a public/private encryption key pair used by the local agent to protect sensitive data exchanged between the server and the client.

Configuration Field 460 includes information such as Service Time To Live (STTL) 464, Server information 466, and transcoding information 468. STTL 464 is used by the local agent to release further access to services once time has expired. Server information 466 includes information that can be negotiated by the handheld devices, such as bandwidth information, available protocols, and status information. Transcoding information 468 includes information about how the data is displayed based on the screen size and resolution of the handheld device.

Id Field 470 includes Strip Information Element (SIE) Identifier 475. SIE 475 is a unique identifier for SIE 400. SIE Identifier 475 is different from the Event Identifier in that each SIE is assigned with a unique identifier that is mainly used to uniquely identify the data in the navigation tree.

Description Field 480 includes description information about the corresponding content. The description includes the address of the content on the server, such as URL 482. The description can also include data 484 about the content, such as any additional cost to download the corresponding content which may be in addition to any subscription fees paid by the user. Description 480 also includes text description 486 which includes a short description that can be displayed to the user in order for the user to determine whether he wants to download the corresponding content.

Figure 5:
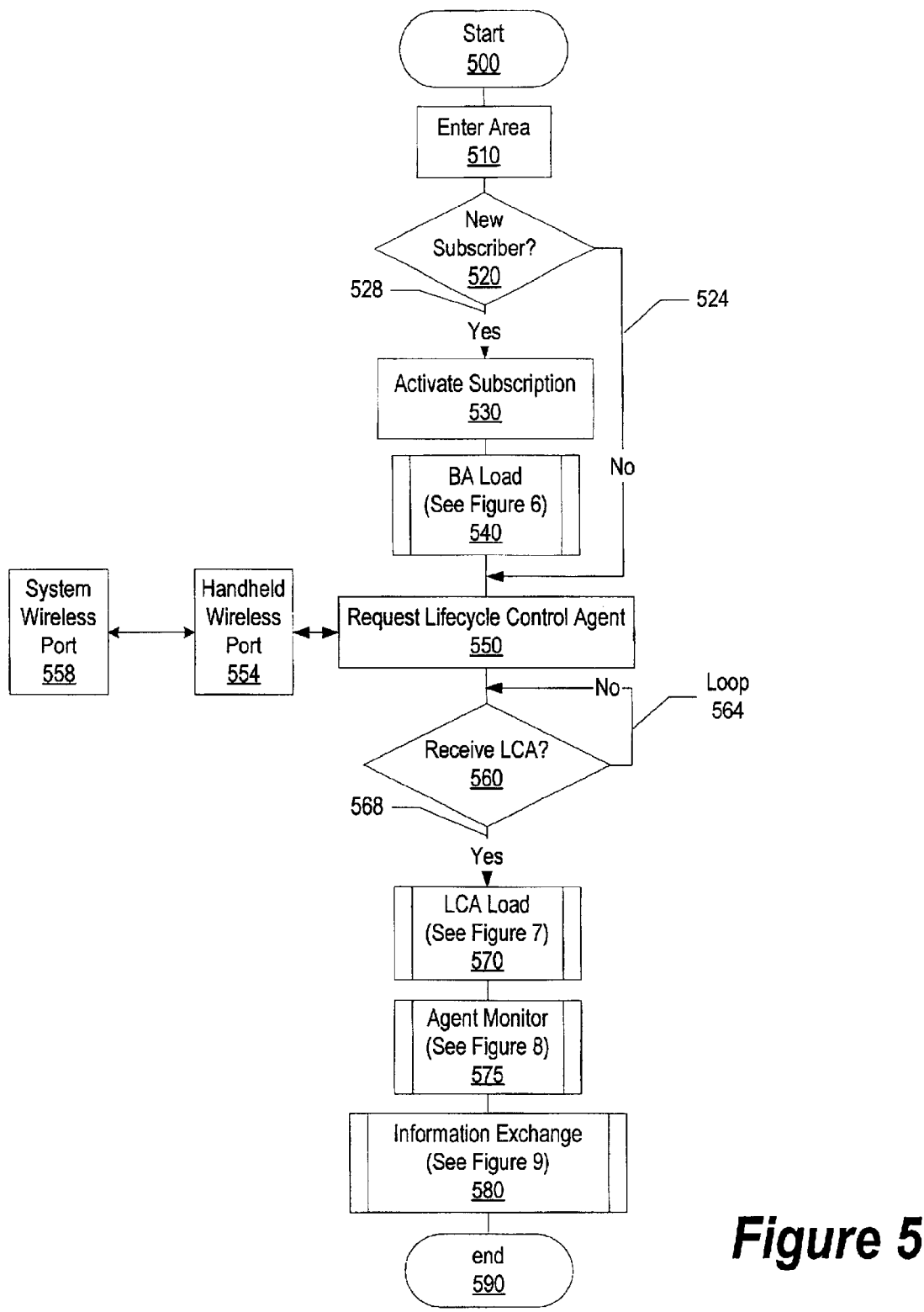
FIG. 5 is a high level flowchart showing an agent loading process and information exchange.

FIG. 5 is a high level flowchart showing an agent loading process and information exchange. Processing commences at 500, whereupon a subscriber enters an area (step 510), such as an event location. A determination is made as to whether the subscriber is new or is already a registered subscriber (decision 520). If the subscriber is not new, decision 520 branches to "No" branch 524 whereupon a Lifecycle Control Agent is requested (step 550). For example, a subscriber can have an annual subscription to a museum, and already be registered at the museum and already have a bootstrap agent loaded in his handheld device. On the other hand, if the subscriber is new, decision 520 branches to "yes" branch 528 whereupon a subscription is activated for the event (step 530). Subscription activation may also include receiving payment information, such as a credit card number, from the user and charging the user the corresponding subscription fee. After the subscription activates, a bootstrap agent loads into the subscribers handheld device (pre-defined process block 540, see FIG. 6 for further details). After the bootstrap agent loads, the bootstrap agent requests a Lifecycle Control Agent (LCA) (step 550) through handheld wireless port 554. The LCA may be loaded if the handheld device does not yet have an LCA or if it is determined that an LCA currently loaded on the handheld device is outdated and needs to be upgraded with a new LCA version. The handheld wireless port sends the request to system wireless port 558 and receives the Lifecycle control agent in the same manner. A determination is made as to whether the LCA has been received (decision 560). If the LCA has not yet been received, decision 560 branches to "No" loop 554 whereupon processing loops back and waits for the LCA. On the other hand, when the LCA is received, decision 560 branches to "Yes" branch 558 whereupon the LCA loads (pre-defined process block 570, See FIG. 8 for further details). The LCA is used for downloading content corresponding to the subscribed event.

Agent Monitoring also commences (pre-defined process block 575, see FIG. 8 for further details) whereupon the bootstrap agent and the Lifecycle Control Agent each monitor each other and restart one another in the event of a failure. The subscriber is now ready for information exchange (pre-defined process block 580, See FIG. 9 for further details) during which time the Lifecycle Control Agent is used to download various content associated with the subscribed event. When information exchanges has completed, for example at the end of the event, processing terminates at 590.

Figure 6:
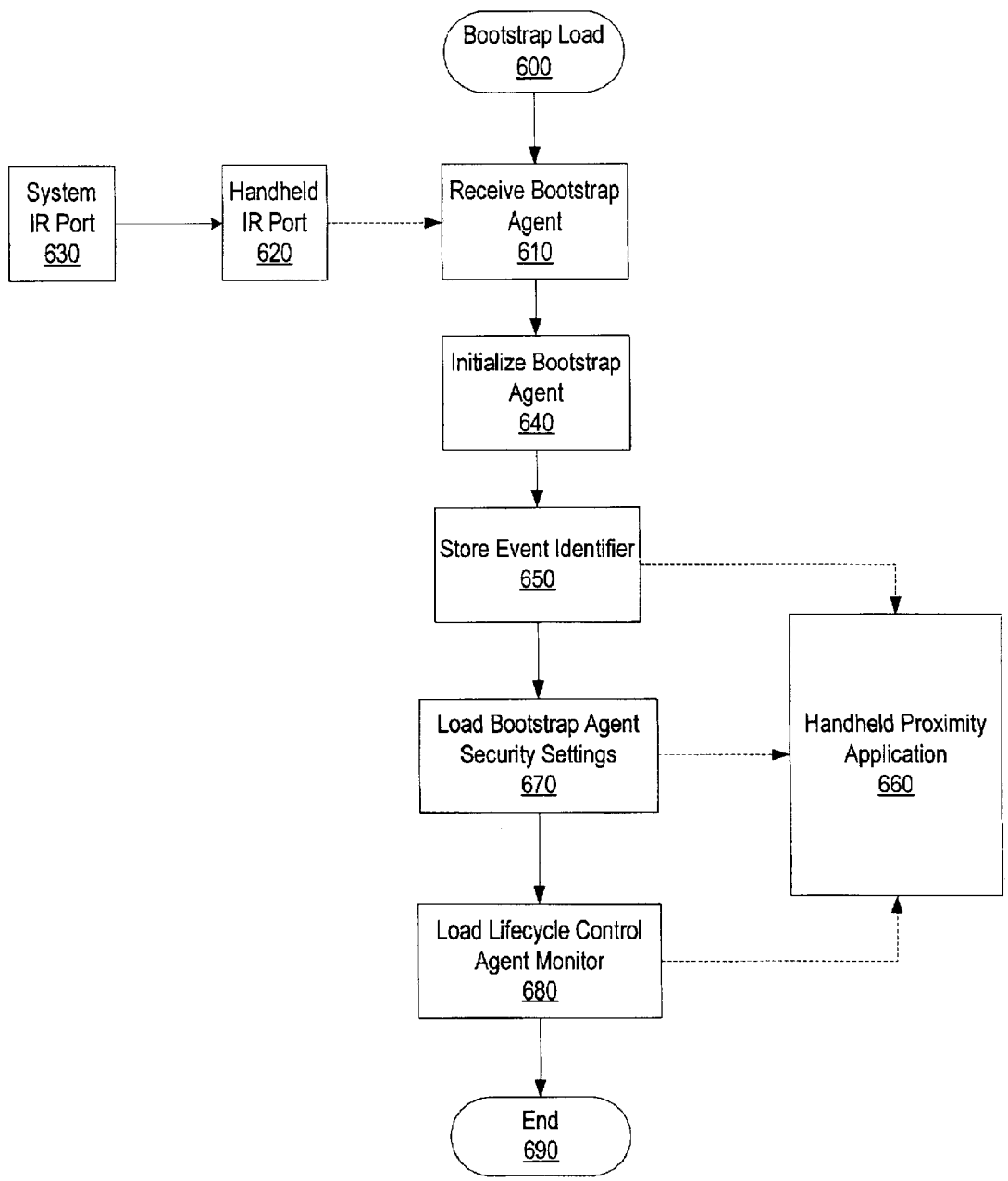
FIG. 6 is a flowchart showing the Bootstrap Agent loading process.

FIG. 6 is a flowchart showing the Bootstrap Agent loading process. Processing commences at 600, whereupon the handheld receives a bootstrap agent (step 610) through handheld Infra Red (IR) port 620. Handheld IR port 620 receives the bootstrap agent from system IR port 630. Once the bootstrap agent is received, the bootstrap agent is initialized (step 640) and Event Identifier is stored (step 650) in Handheld Proximity Application 660. Event ID is unique in time and space and is used as a discriminator to assure that there is no overlap between information exchanged in different events that happen in the same proximity range at the same time. Bootstrap agent security settings are loaded in handheld proximity application 660 (step 670) along with the Lifecycle control agent monitor (step 680). The security settings and LCA monitor are used to ensure proper operation of the LCA. If the LCA is determined to be inoperable when it should be operational, the bootstrap agent restarts the LCA (see FIG. 8 for further details). After the bootstrap agent information is loaded into handheld proximity application 660, processing returns at 690.

Figure 7:
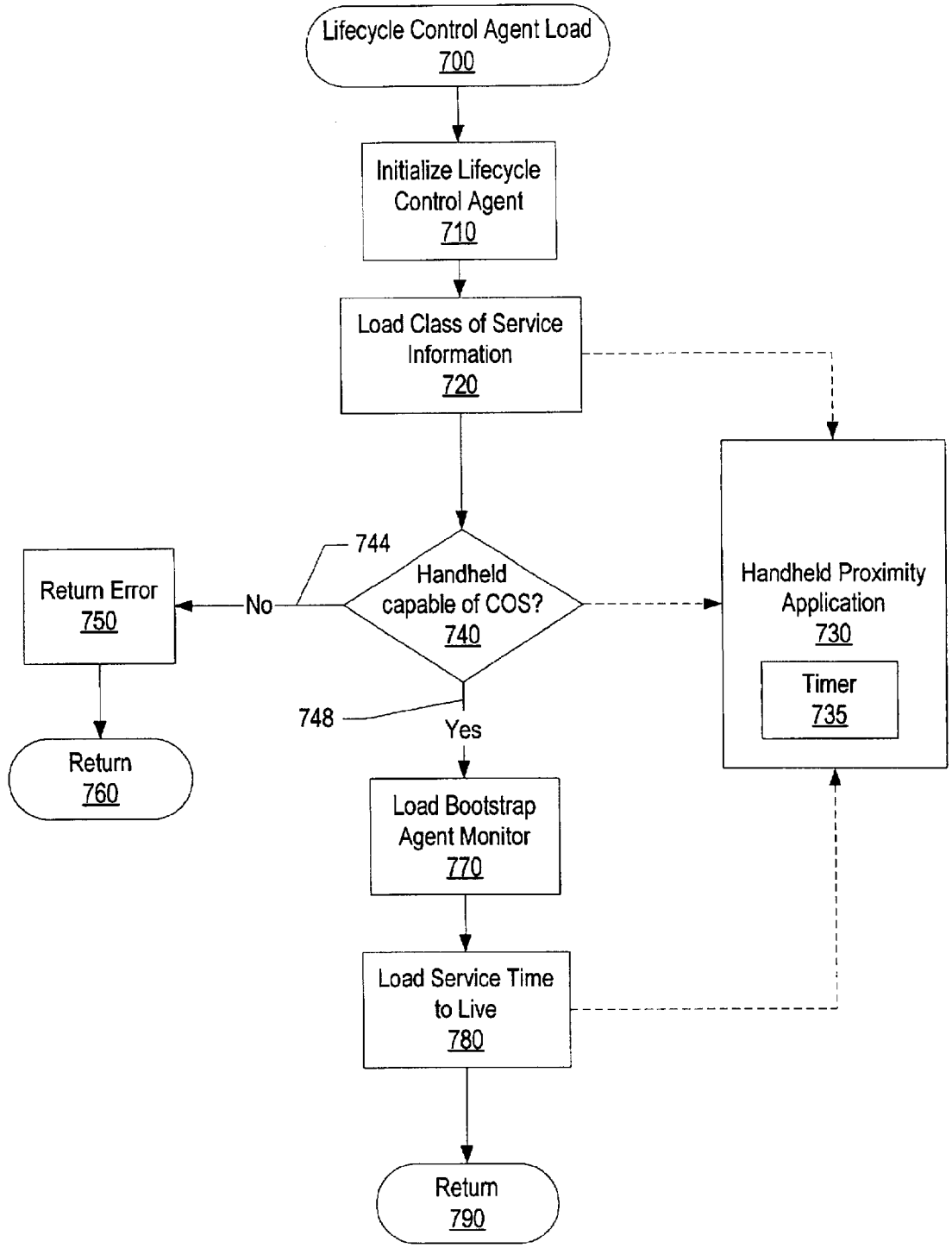
FIG. 7 is a flowchart showing the Lifecycle Control Agent Loading process.

FIG. 7 is a flowchart showing the Lifecycle Control Agent Loading process. Processing commences at 700, whereupon the Lifecycle Control Agent (LCA) is initialized (step 710). Class of Service (COS) information is retrieved from the LCA (step 720) and loaded into Handheld Proximity Application 730. Examples of COS are text, video, and video plus. A determination is made as to whether the handheld is capable of the Class of Service (decision 740). For example, if the Class of Service is video, the handheld should have the capability of playing video. If the handheld is not capable of the COS, decision 740 branches to "No" branch 744 whereupon an error is returned (step 750) and processing returns at 760. On the other hand, if the handheld is capable of the COS, decision 740 branches to "Yes" branch 748 whereupon the bootstrap agent monitor is loaded (step 770). The bootstrap agent monitor is used to ensure the proper operation of the LCA. If the bootstrap agent is determined to be inoperable when it should be functioning properly, the LCA restarts the bootstrap agent. Service time to live is loaded (step 780) into timer 735 that tracks how much time is remaining for the Lifecycle Control Agent to be active and processing returns at 790.

Figure 8:
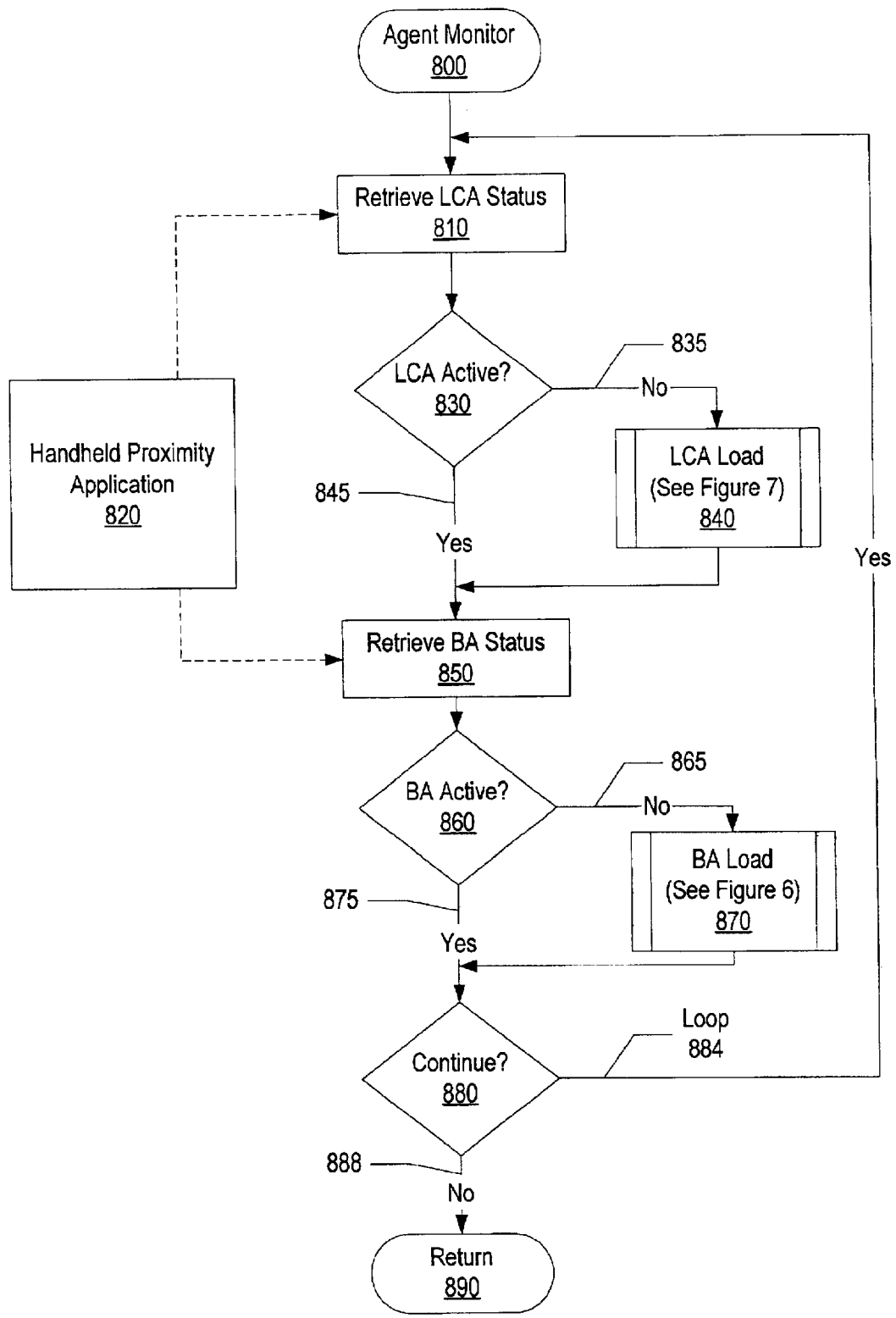
FIG. 8 is a flowchart showing the Bootstrap Agent and Lifecycle Control Agent monitoring each other.

FIG. 8 is a flowchart showing the Bootstrap Agent and Lifecycle Control Agent monitoring each other. Agent monitoring commences at 800, whereupon the Lifecycle Control Agent (LCA) status is retrieved (step 810) from handheld proximity application 820. The LCA status includes information about whether the LCA is functioning properly. A determination is made as to whether the LCA is active and functioning properly (decision 830). If the LCA is not functioning properly, decision 830 branches to "No" branch 835 whereupon the LCA is restarted (pre-defined process block 840, See FIG. 7 for further details). On the other hand, if the LCA is functioning properly, decision 830 branches to "Yes" branch 845 whereupon the bootstrap agent status is retrieved (step 850) from handheld proximity application 820. A determination is made as to whether the Bootstrap agent is functioning properly (decision 860). If the bootstrap agent is not functioning properly, decision 860 branches to "No" branch 865 whereupon the BA is restarted (pre-defined process block 870, See FIG. 6 for further details). On the other hand, if the BA is functioning properly, decision 860 branches to "Yes" branch 875 whereupon a determination is made as to whether the monitoring continues (decision 880). If the user decides to stop information exchange activity, or the event is over, decision 880 branches to "No" branch 888 whereupon monitoring ends at 890. On the other hand, if the event is ongoing, decision 880 branches to "Yes" loop 884 whereupon the monitoring process starts over.

Figure 9:
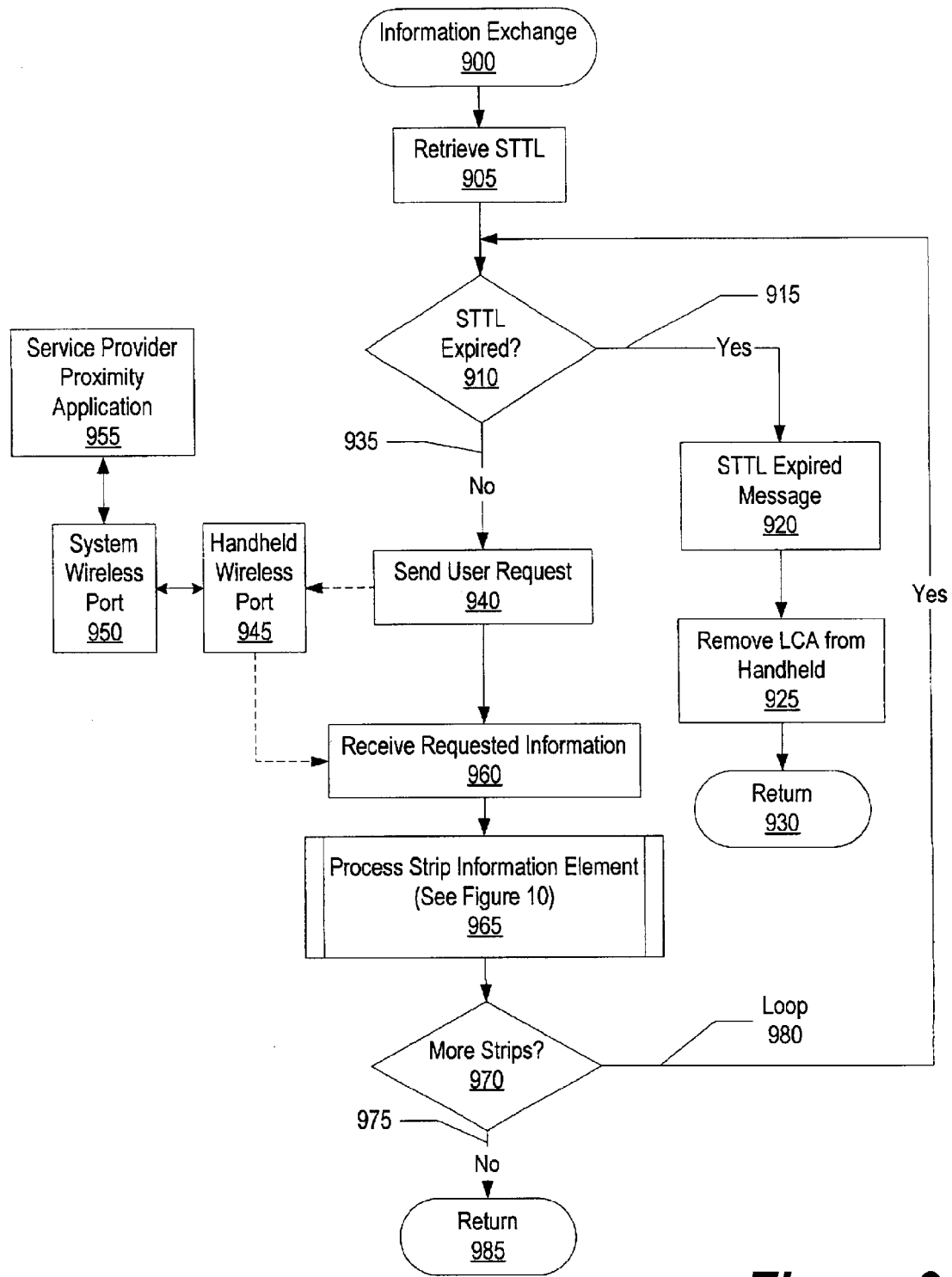
FIG. 9 is a flowchart showing information exchange between the handheld device and service provider.

FIG. 9 is a flowchart showing information exchange between the handheld device and service provider. Processing commences at 900, whereupon the Service Time To Live (STTL) is retrieved (step 905) from the handheld proximity application. The STTL includes information about how long the handheld device is allowed to exchange information based on the length of the event. A determination is made as to whether the STTL is expired (decision 910). If the STTL is expired, decision 910 branches to "Yes" branch 915 whereupon an expiration message is reported (step 920). The lifecycle control agent is removed from the handheld (step 925) and processing returns at 930. On the other hand, if more time remains for the service, decision 910 branches to "No" branch 935 whereupon a request for content is performed at 940. The user request is sent from handheld wireless port 945 to system wireless port 950. Service Provider Proximity Application 955 determines the corresponding content and sends it to the handheld device through system wireless port 950. The requested information is received (step 960) through handheld wireless port 945 whereupon strip information element (SIE) processing takes place (pre-defined process block 965, See FIG. 10 for further details). A determination is made as to whether more strips are being processed. If no more strips are being processed, decision 970 branches to "No" branch 975 whereupon processing returns at 985. On the other hand, if more strips will be processed, decision 970 branches to "Yes" Loop 980 whereupon processing continues.

Figure 10:
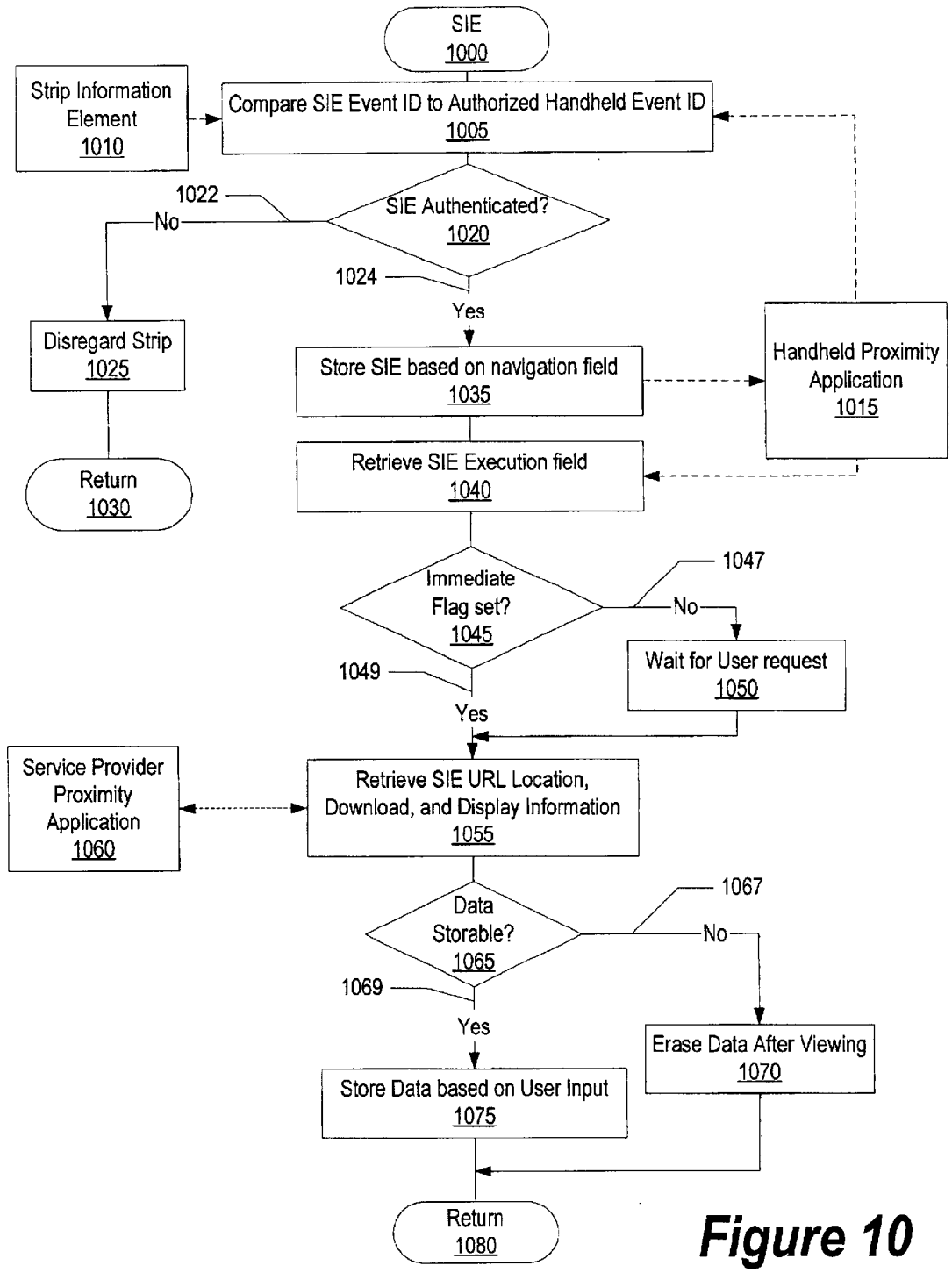
FIG. 10 is a flowchart showing a Strip Information Element being received and processed.

FIG. 10 is a flowchart showing a Strip Information Element (SIE) being received and processed. Processing commences at 1000, whereupon processing compares event ID's for received SIE 1010 and authorized event ID from handheld proximity application 1015 (step 1005). A determination is made as to whether the handheld device is authorized to receive the SIE (decision 1020) based on the event ID comparison. If the handheld device is not authorized to receive the SIE, decision 1020 branches to "No" branch 1022 whereupon the strip is ignored (step 1025) and processing returns at 1030. On the other hand, if the handheld device is authorized to receive the SIE, decision 1020 branches to "Yes" branch 1024 whereupon the received SIE is stored in handheld proximity application 1015 (step 1035). The SIE Execution field is retrieved at 1040 from handheld proximity application 1015. The execution field includes information as to whether the data should be retrieved immediately or upon a user request. For example, live video information may be downloaded immediately, while replay video may be performed in response to a user request. A determination is made as to whether the data should be retrieved immediately or on user request (decision 1045). If the data is to be retrieved immediately, decision 1045 branches to "Yes" branch 1049 whereupon the SIE URL location is retrieved and the data is downloaded from Service Provider Proximity Application (1060) and the downloaded data is displayed on the display screen (step 1055). On the other hand, if the data is downloaded on user request, decision 1045 branches to "No" branch 1047 whereupon processing waits for a user request (step 1050). When the user requests the data, processing continues from step 1050 whereby the SIE URL location is retrieved and the data is downloaded from Service Provider Proximity Application (1060) and the downloaded data is displayed on the display screen (step 1055). The lifecycle field is retrieved at step 1060 which includes information as to whether the data can be stored after viewing, or if the data is discarded after viewing. For example, data that is readily available on the Internet, like a player's statistics, may be stored on the subscribers handheld device after the event. A determination is made as to whether the data is storable after viewing (decision 1065). If the data is not storable, decision 1065 branches to "No" branch 1067 whereupon the data is removed after viewing (step 1070). On the other hand, if the data can be stored after viewing, decision 1065 branches to "Yes" branch 1069 whereupon the data is stored if the user requests (step 1075), and processing returns at 1080.

Figure 11:
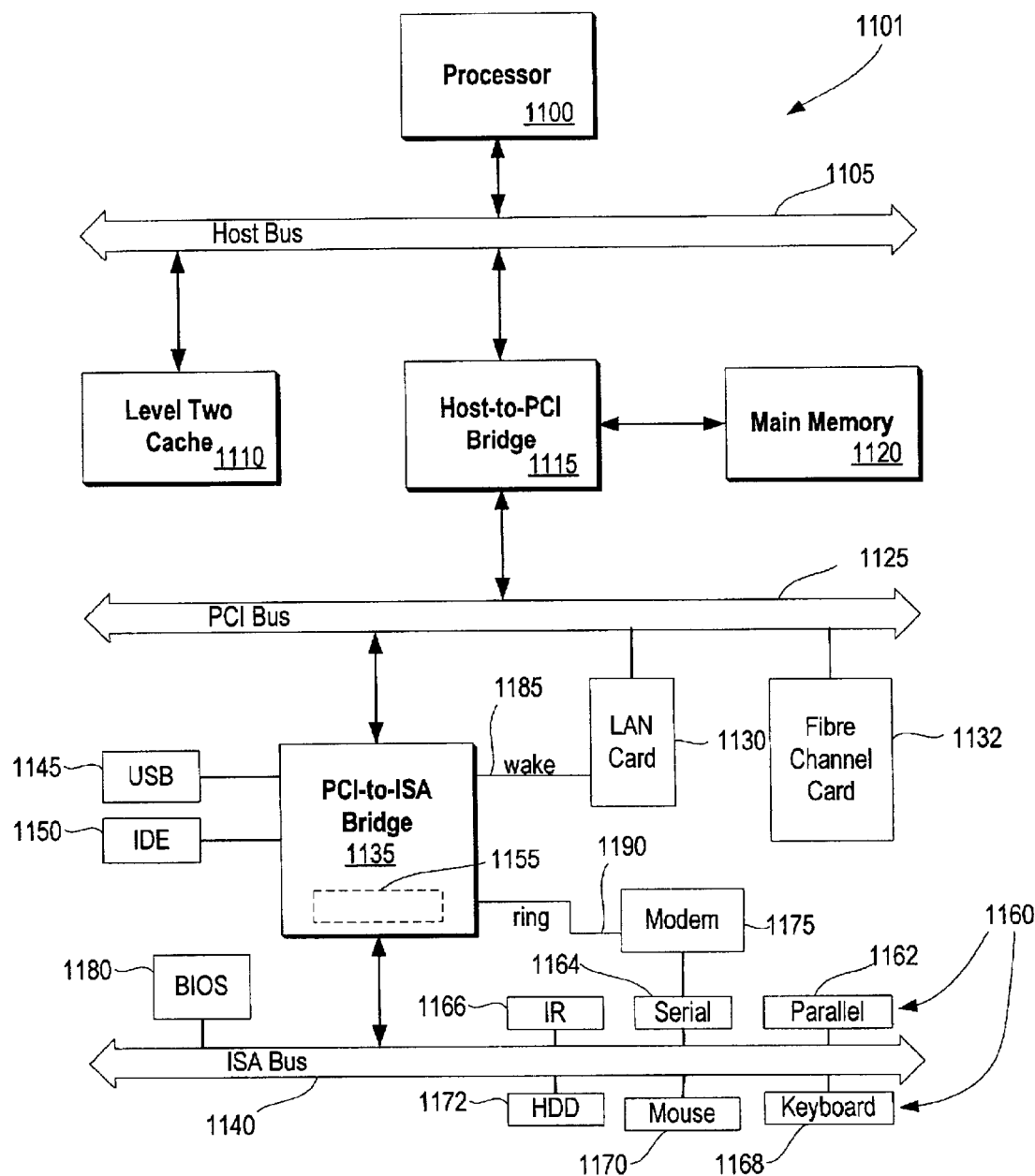
FIG. 11 is a block diagram of an information handling system capable of implementing the present invention.

FIG. 11 illustrates information handling system 1101 which is a simplified example of a computer system capable of performing the server and client operations described herein. Computer system 1101 includes processor 1100 which is coupled to host bus 1105. A level two (L2) cache memory 1110 is also coupled to the host bus 1105. Host-to-PCI bridge 1115 is coupled to main memory 1120, includes cache memory and main memory control functions, and provides bus control to handle transfers among PCI bus 1125, processor 1100, L2 cache 1110, main memory 1120, and host bus 1105. PCI bus 1125 provides an interface for a variety of devices including, for example, LAN card 1130. PCI-to-ISA bridge 1135 provides bus control to handle transfers between PCI bus 1125 and ISA bus 1140, universal serial bus (USB) functionality 1145, IDE device functionality 1150, power management functionality 1155, and can include other functional elements not shown, such as a real-time clock (RTC), DMA control, interrupt support, and system management bus support. Peripheral devices and input/output (I/O) devices can be attached to various interfaces 1160 (e.g., parallel interface 1162, serial interface 1164, infrared (IR) interface 1166, keyboard interface 1168, mouse interface 1170, and fixed disk (HDD) 1172) coupled to ISA bus 1140. Alternatively, many I/O devices can be accommodated by a super I/O controller (not shown) attached to ISA bus 1140.

BIOS 1180 is coupled to ISA bus 1140, and incorporates the necessary processor executable code for a variety of low-level system functions and system boot functions. BIOS 1180 can be stored in any computer readable medium, including magnetic storage media, optical storage media, flash memory, random access memory, read only memory, and communications media conveying signals encoding the instructions (e.g., signals from a network). In order to attach computer system 1101 to another computer system to copy files over a network, LAN card 1130 is coupled to PCI bus 1125 and to PCI-to-ISA bridge 1135. Similarly, to connect computer system 1101 to an ISP to connect to the Internet using a telephone line connection, modem 1175 is connected to serial port 1164 and PCI-to-ISA Bridge 1135.

While the computer system described in FIG. 11 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of exchanging data between computing devices, said method comprising:
    identifying a receiving device;
    sending a receiving agent to the receiving device, wherein the receiving agent identifies download data, and wherein the receiving agent includes a bootstrap agent and a lifecycle control agent that monitor each other while executing on the receiving device; and
    downloading the identified download data to the receiving device.

2. The method as described in claim 1 further comprising:
    admitting a user of the receiving device to an event, wherein the sending is performed in response to the admitting.

3. The method as described in claim 1 further comprising;
    determining whether the receiving agent is operational; and
    reinitializing the receiving agent in response to the determination.

4. The method as described in claim 1 further comprising:
    identifying a class of service; and
    sending content information corresponding to the class of service to the receiving device.

5. The method as described on claim 4 wherein the class of service is selected from the group consisting of text only, video, video plus, and audio.

6. The method as described in claim 1 wherein the receiving agent includes a service time;
   setting a timer corresponding to the service time; and
   de-activating the receiving agent in response to the timer reaching the service time.

7. The method as described in claim 1 further comprising:
   identifying an event with an event identifier;
   selecting event data corresponding to the event identifier; and
   downloading selected event data to the receiving device.

8. An information handling system comprising:
   one or more processors;
   a memory accessible by the processors;
   a network interface for communicating with other information handling systems;
   one or more nonvolatile storage areas accessible by the processors; and
   a data exchange tool for sending and receiving wireless information, the data exchange tool including:
      means for identifying a receiving device;
      means for sending a receiving agent to the receiving device, wherein the receiving agent identifies download data, and wherein the receiving agent includes a bootstrap agent and a lifecycle control agent that monitor each other while executing on the receiving device; and
      means for downloading the identified download data to the receiving device.

9. The information handling system as described in claim 8 further comprising:
   means for admitting a user of the receiving device to an event, wherein the sending is performed in response to the admitting.

10. The information handling system as described in claim 8 further comprising:
    means for determining whether the receiving agent is operational; and
    means for reinitializing the receiving agent in response to the determination.

11. The information handling system as described in claim 8 further comprising:
    means for identifying a class of service; and
    means for sending content information corresponding to the class of service to the receiving device.

12. The information handling system as described in claim 11 wherein the means for the class of service is selected from the group consisting of text only, video, video plus, and audio.

13. The information handling system as described in claim 8 wherein the means for the receiving agent includes a service time;
    means for setting a timer corresponding to the service time; and
    means for de-activating the receiving agent in response to the timer reaching the service time.

14. The information handling system as described in claim 8 further comprising:
    means for identifying an event with an event identifier;
    means for selecting event data corresponding to the event identifier; and
    means for downloading selected event data to the receiving device.

15. A computer program product stored on a computer operable medium for exchanging data between computing devices, said computer program product comprising:
    means for identifying a receiving device;
    means for sending a receiving agent to the receiving device, wherein the receiving agent identifies download data, and wherein the receiving agent includes a bootstrap agent and a lifecycle control agent that monitor each other while executing on the receiving device; and
    means for downloading the identified download data to the receiving device.

16. The computer program product as described in claim 15 further comprising:
    means for admitting a user of the receiving device to an event, wherein the sending is performed in response to the admitting.

17. The computer program product as described in claim 15 further comprising:
    means for determining whether the receiving agent is operational; and
    means for reinitializing the receiving agent in response to the determination.

18. The computer program product as described in claim 15 further comprising:
    means for identifying a class of service; and
    means for sending content information corresponding to the class of service to the receiving device.

19. The computer program product as described in claim 18 wherein the means for the class of service is selected from the group consisting of text only, video, video plus, and audio.

20. The computer program product as described in claim 15 wherein the means for the receiving agent includes a service time;
    means for setting a timer corresponding to the service time; and
    means for de-activating the receiving agent in response to the timer reaching the service time.

21. The computer program product as described in claim 15 further comprising:
    means for identifying an event with an event identifier;
    means for selecting event data corresponding to the event identifier; and
    means for downloading selected event data to the receiving device.

* * * * *